United States Patent [19]

Gunjima et al.

[11] 4,051,002

[45] Sept. 27, 1977

[54] ELECTRODIALYSIS FOR AQUEOUS SOLUTION OF BASE

[75] Inventors: Tomoki Gunjima, Yokohama; Toshio Ichiki, Kawasaki, both of Japan

[73] Assignee: Asahi Glass Company, Ltd., Tokyo, Japan

[21] Appl. No.: 685,984

[22] Filed: May 13, 1976

[30] Foreign Application Priority Data

July 25, 1975 Japan .................................. 50-90188

[51] Int. Cl.$^2$ .............................................. B01D 13/02
[52] U.S. Cl. ............................... 204/180 P; 204/98; 204/102; 204/296; 204/301
[58] Field of Search .................... 204/98, 102, 180 P, 204/252, 253, 296, 301

[56] References Cited

U.S. PATENT DOCUMENTS

| 2,723,229 | 11/1955 | Bodamer | 204/98 |
| 2,967,807 | 1/1961 | Osborne et al. | 204/98 |
| 3,017,338 | 1/1962 | Butler, Jr. et al. | 204/98 |
| 3,657,104 | 4/1972 | Hodgdon, Jr. | 204/301 |
| 3,904,496 | 9/1975 | Harke et al. | 204/98 |
| 3,925,332 | 12/1975 | Naito et al. | 204/296 X |
| 3,976,549 | 8/1976 | Falvo | 204/98 |

Primary Examiner—Arthur C. Prescott
Attorney, Agent, or Firm—Oblon, Fisher, Spivak, McClelland & Maier

[57] ABSTRACT

In an electrodialysis process for aqueous base-containing solutions the improvement which comprises using a cation-exchange membrane made of a copolymer of ethylene and an unsaturated carboxylic acid or a salt thereof having an ion-exchange capacity of 0.7 to 3 m equivalent/g (dry resin).

12 Claims, No Drawings

ELECTRODIALYSIS FOR AQUEOUS SOLUTION OF BASE

BACKGROUND OF THE INVENTION

1. Field of the Invention

Solutions containing a base (hereinafter referred to as a base-containing solution) are formed in many industrial processes. For example, sodium hydroxide-containing waste solutions are formed in the digestion of pulp in the viscose rayon industry, base-containing solutions are also formed when treating metals and in the recovery of ion-exchange resins. It is necessary to conduct selective concentration and recovery of the base from the base-containing solution or dealkalization of the base-containing solution to produce a highly concentrated base solution. Alternatively, the solution can be further processed to produce a useful product or subjected to further treatment to prevent water pollution when it is discharged.

2. Description of the Prior Art

It has been proposed to selectively recover the base in a concentrating compartment adjacent to a diluting compartment by feeding the base-containing solution into the iondiluting compartment of an electrodialytic cell as one method of concentrating or removing the base from the-base-containing solution. However, in conventional electrodialysis, the base, such as hydroxyl ions, leaks through the cation-exchange membrane by diffusion caused by the concentration difference or electrophoresis. When the concentration of the base in the concentrating compartment is low, this phenomena causes little difficulty. However, when the concentration of the base in the concentrating compartment is high, the efficiency of the electric current is greatly decreased and industrial operation is not feasible.

It has been known to produce aqueous base-containing solutions, such as aqueous alkali hydroxide solutions by electrolytic dialysis of an aqueous alkali chloride solution in the diaphragm method using a cation-exchange membrane as a diaphragm, because the process creates no pollution. In the conventional process, cation-exchange membranes have been used as partitions between the anodes and cathodes to form anolyte compartments and catholyte compartments. An aqueous alkali chloride solution is fed to the anolyte compartments and the flow of electric current produces an aqueous alkali hydroxide solution in the catholyte compartment by electrolytic dialysis. In this process, when the concentration of the alkali hydroxide base in the catholyte compartment is increased, hydroxyl ions leak through the cation-exchange membrane by the diffusion caused by the concentration difference and electrophoresis. Accordingly, when the concentration of alkali hydroxide in the catholyte compartment is low, this phenomena causes little difficulty. However, when the concentration of the alkali hydroxide in the catholyte compartments has an industrial concentration equal to or greater than 15 wt.%, the current efficiency is less than 70% and industrial operation is seldom attempted. Accordingly, there exists a need for a process for the electrodialysing aqueous base solutions wherein diffusion of the base does not occur.

SUMMARY OF THE INVENTION

It is an object of the present invention to provide a novel electrodialysis process including electrolytic dialysis of aqueous base-containing solution. It is another object of this invention to provide a novel electrodialysis process having high current efficiency while inhibiting diffusion of the base through a cation-exchange membrane. It is another object of this invention to provide a novel electrodialysis process for aqueous base-containing solutions by using a cation-exchange membrane made of a specific copolymer which has not previously been used as an cation-exchange membrane. It is yet another object of this invention to provide a novel electrodialysis process for the concentration or delkalization of aqueous base-containing solution having high current efficiency. It is a further object of this invention to provide a novel electrolytic dialysis process for producing alkali hydroxide form an aqueous alkali chloride solution in high current efficiency.

These and other objects of this invention have been attained by using a cation-exchange membrane made of a copolymer of ethylene and an unsaturated carboxylic acid or salt thereof which has an ion-exchange capacity of 0.7 to 3 m equivalent/g (dry resin), in the electrodialysis process including the electrolytic dialysis of a base-containing solution.

DESCRIPTION OF THE EMBODIMENTS

The cation-exchange membrane used in the present invention is made of a copolymer of ethylene and an unsaturated carboxylic acid or salt thereof. Prior to this invention these copolymers have not been used as an ion-exchange membrane. The copolymers are substantially linear copolymers whose structure contains substantially no cross-linking and, therefore, they have high swelling properties. Accordingly, it is considered that these copolymers have not been used as ion-exchange membranes because of the possibility of the membrane breaking. However, the present inventors have found that membranes made of copolymers which have the special combination of ethylene and an unsaturated carboxylic acid of salt thereof and the specific ion-exchange capacity, are stable when they contact with a base-containing solution, because the swelling phenomena is largely inhibited. Moreover, it has been found that when the cation-exchange membrane is used in electrodialysis processes, including the electrolytic dialysis of a base-containing solution, the diffusion caused by the concentration difference of the base is low and the leakage caused by electrophoresis also low which results in remarkably high current efficiency.

It is important that the ion-exchange capacity of the cation-exchange membrane made of the copolymer of ethylene and the unsaturated carboxylic acid or salt thereof, be in the range of from 0.7 to 3 m equivalent/g (dry resin). When it is higher than this range, the water content of the membrane is too high and the current efficiency is too low. On the other hand, when it is lower than 0.7 m equivalent/g, the electric resistance is too high. It has been found that the ion-exchange capacity is preferably in the range of from 0.9 to 2.5 m equivalent/g (dry resin), from the viewpoints of current efficiency and electrical resistance.

The ion-exchange capacity is determined by the ratio of ethylene to the unsaturated carboxylic acid or salt thereof in the copolymer. The unsaturated carboxylic acids and salts for the copolymer used for the cation-exchange membrane are carboxylic acids and salts of carboxylic acids having an unsaturated bond in the molecule which is polymerizable. Suitable unsaturated carboxylic acids and salts thereof include acrylic acid, methacrylic acid, itaconic acid, maleic acid, maleic anhydride, fumaric acid, fumaric anhydride, and quaternary ammonium salts, alkali metal salts e.g. sodium and potassium salts, Periodic Table Group II metal salts e.g. zinc, calcium and magnesium salts. The α, β-unsaturated carboxylic acids and salts thereof can be precursors such as esters, amides and nitriles thereof which form the unsaturated carboxylic acid or salt thereof by hydrolysis or neutrization. In the production of the copolymer, two or more unsaturated carboxylic acids or salts can be used, and if desired a comonomer such as styrene, vinyl chloride, vinylidene chloride, vinyl alcohol, vinyl ether, etc., can be added.

The copolymer of the present invention can be produced by conventional polymerization (such as that disclosed in U.S. Pat. No. 3,264,272). The molecular weight of the copolymer is preferably in the range of from 5,000 to 500,000 especially 15,000 to 300,000 from the viewpoint of membrane preparation.

Among the copolymers, copolymers having the following units are preferably used from the viewpoints of ion exchange properties of the membrane and availability.

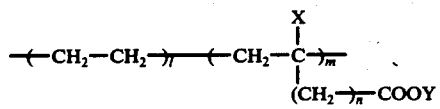

wherein X represents hydrogen or methyl, Y represents hydrogen or a metal atom; and Y is preferably hydrogen, sodium or zinc; m/l (molar ratio) is 0.02 to 0.15; especially 0.03 to 0.12; n is 0 to 10.

It has been found that the glass transition temperature of the copolymer for the cation-exchange membrane is preferably at least 20° C below the temperature of the electrodialysis process including electrolytic dialysis, whereby the current efficiency in the electrodialysis process can be satisfactorily high. The effect of the glass transition temperature of the copolymer on the current efficiency is remarkable when treating aqueous base-containing solutions having high concentration. It is advantageous in industrial operation to use a copolymer having such a glass transition temperature. The glass transition temperature of the copolymer is dependent upon the components, crosslinking degree, molecular weight, ion-exchange capacity and the like. It is especially preferable to use a copolymer having a glass transition temperature at least 30° C below the temperature for the electrodialysis process and higher than −100° C because the tensile strength of the membrane is decreased when the glass transition temperature is too low.

The thickness of the cation-exchange membrane is in the range of from 20 to 500μ, especially from 30 to 300μ from the viewpoints of electrical resistance and mechanical strength. It is possible to reinforce the cation-exchange membrane reinforced with a thin supporter such as a film, cloth and woven fabric. The supporter can be made of a polymer having alkali resistance such as olefin polymers, fluorine-containing polymers, vinyl halide polymers and the like. When the supporter is used, the weight of the resin as the supporter is not considered in the ion-exchange capacity.

In accordance with the present invention, the electrodialysis process including the electrolytic dialysis of the aqueous base-containing solution is conducted by using the cation-exchange membrane. The operation is as follows. When the aqueous base-containing solution is electrodialyzed to concentrate or remove the base, an electrodialytic cell equipped with the cation-exchange membranes and anion-exchange membranes which are alternatively arranged between the electrodes is usually used. The electrodialytic cell can be of the filterpress type or unit-cell type. The anion-exchange membranes used to prepare the electrodialytic cell are made of polymerization-type or condensation-type polymers, are of a uniform or nonuniform-type and can be weakly basic to strongly basic anion-exchange membranes having ion-exchange groups such as primary, secondary and tertiary amino groups, quaternary ammonium group, quaternary phosphonium group and the like. The anion-exchange membrane can have selectivity for particular anions. On the other hand, with regard to the cation-exchange membrane, the carboxylic acid salt of the copolymer can be converted to the corresponding carboxylic acid or another metal salt thereof. For example, a copolymer having a polyvalent metal salt such as —COOZn is preferably converted to —COONa by contacting with an alkali hydroxide or alkali chloride when it is to be used for the electrodialysis of sodium hydroxide. The base-containing solution is fed to ion-diluting compartments partitioned with the anion-exchange membrane in the anode side and the cation-exchange membrane in the cathode side, among the compartments of the electrodialysis cell. A suitable electrolyte solution is fed into the ion-concentrating compartment partitioned with the cation-exchange membrane in the anode side and the anion-exchange membrane on the cathode side, in the electrodialysis process. The concentrating compartments, the base comes into depends upon the dialysis. Accordingly, it is unnecessary to add an electrolyte solution from an external source.

The electrodialysis is preferably conducted at a current density of from 0.1 to 50 A/dm², whereby the cations and anions (hydroxyl ions) of the base in the diluting compartment move through the cation-exchange membrane and the anion-exchange membrane respectively to the concentrating compartment. As a characteristic feature of the present invention, the cation exchange membrane used in the invention has low base premeability, the amount of leakage of the base is small even though the base is concentrated in the concentrateing compartments by the electrodialysis to increase the concentration of the base. Accordingly, the current efficiency of the electrodialysis process of this invention is remarkably superior to that of the conventional electrodialysis processes. As one example of the electrolytic dialysis of an aqueous base-containing solution using the cation-exchange membrane, the electrolytic dialysis for producing an alkali metal hydroxide from an aqueous alkali metal chloride solution will be illustrated.

The electrolytic dialysis is conducted in an electrolytic dialysis cell wherein the anolyte compartments and the catholyte compartments are formed by partitions of the cation-exchange membrane between the cathodes and the anodes. Only the cation-exchange membrane need be used for the preparation of the electrolytic dialytic cell. However, the cation-exchange membranes have relatively low oxidation and chlorine resistance. Accordingly, it is preferable to dispose a diaphragm having high oxidation and chlorine resistance between the cation-exchange membrane and the anode to form intermediate compartments. The diaphragms having high oxidation and chlorine resistance can be any diaphragm having such resistances and ion-permeability, and include asbestos diaphragms, porous diaphragms of polytetrafluoroethylene and fluorine-containing cation-exchange membranes such as membranes made of copolymers of tetrafluoroethylene-sulfonated perfluorovinyl ether and copolymers of tetrafluoroethylene and carboxylated perfluorovinyl ether and the like. When a fluorine-containing cation-exchange membrane is used as the diaphragm having high oxidation and chlorine resistance, it is possible to satisfactorily prevent permeation of the oxidizing compound formed on the anode, through the diaphragm to the cathode side. Thus, the cation-exchange membrane disposed at the cathode side of the diaphragm can be satisfactorily protected.

When the cation-exchange membrane is used for electrolytic dialysis, it is possible to convert the carboxylic acid salt of the copolymer to the corresponding carboxylic acid or another other salt. For example, the copolymer having polyvalent metal salt such as zinc salt can be converted to the alkali metal salt by contacting it with alkali metal hyddroxide or alkali metal chloride. The electrolytic dialysis cell can be a unipolar cell or bipolar cell. The electrodes can be anitcorrosive electrodes having size stability which are formed by coating a platinum group metal or its oxide onto a substrate of graphite or titanium.

The electrolytic dialytic cell having the anolyte compartments, the catholyte compartments and, if desirable, the intermediate compartments is prepared by partitioning between the cathodes and the anodes with the cation-exchange membranes and if desirable, the diaphragm having the oxidation resistance and chlorine resistance. An aqueous alkalichloride solution (preferably 2.0 to 4.0 N alkali chloride) is fed into the anolyte compartments and the intermediate compartment and the electrolysis is conducted at 20° to 70° C at a current density of from 5 to 40 A/dm$^2$, whereby an alkali hydroxide aqueous solution (6 to 14 N alkali hydroxide) is obtained from the catholyte compartments with a current efficiency higher than 90%. In said electrolytic dialysis, the cation-exchange membrane has remarkably low base permeability. Accordingly, the amount of the base, such as hydroxyl ions, leaked through the cation-exchange membrane is remarkably small even though the concentration of alkali hydroxide increases in the catholyte compartment by the electrolytic dialysis. Accordingly, the current efficiency is the electrolytic dialysis is remarkably high.

In the electrodialysis process including the electrolytic dialysis, various types of base-containing solutions can be treated. The typical base-containing solutions include solutions of alkali metal hydroxide such as sodium hydroxide, potassium hydroxide, etc.; ammonia, aliphatic-, aromatic-, or heterocyclic lower amines such as alkylamines, ethanol-amines, ethylenediamine, pyridine, etc. In the case of the electrolytic dialysis, the process of the present invention is remarkably effective for the treatment of alkali metal hydroxide. In said case, alkali metal hydroxide having a concentration of higher than 40 wt.% can be obtained with a current efficiency higher than 90% from the alkali metal chloride. The content of alkali metal chloride as an impurity in the alkali metal hydroxide (high concentration) can be decreased to less than 50 ppm.

Having generally described the invention, a more complete understanding can be obtained by reference to certain specific examples, which are included for purposes of illustration only and are not intended to be limiting unless otherwise specified.

In the examples, the ion-exchange capacity of the cation-exchange membrane was measured and calculated according to the elementary analysis of carbon atom and hydrogen atom of the H type of cation-exchange membrane.

EXAMPLE 1

A membrane of a copolymer of ethylene and methacrylic acid (molar ratio of methacrylic acid/ethylene: 0.7; number average molecular weight: 75,000; glass transition temperature: −73° C) having an ion-exchange capacity of 2.05 m equivalent/g (dry resin) (Copolymer I) and a thickness of 120μ was treated in 8N-NaOH at 60° C for 14 hours to prepare a cation-exchange membrane of the copolymer (sodium salt). The cation-exchange membranes and anion-exchange membrane of a copolymer of styrene and divinylbenzene (thickness 140μ) which were reinforced with polyvinyl chloride cloth ("Selemion AMV" strongly basic type ion-exchange capacity: 1.8 m equivalent/g (dry resin) manufactured by Asahi Glass Company Ltd.) were alternatively arranged between the anode and cathode through a frame having a thickness of 8 mm and were fastened to assemble a filterpress-type electrodialytic cell each membrane having an effective area of 9 cm$^2$. An aqueous sodium hydroxide solution (1.85 wt.%) was fed to the diluting compartment of the electrodialytic cell at a flow rate of 3.0 cm/sec. and a sodium hydroxide aqueous solution (5.0 wt.%) was fed to both the anolyte and catholyte compartments at a flow rate of 1.0 cm/sec. On the other hand, a sodium hydroxide aqueous solution (15.0 wt.%) was charged into the concentrating compartment. The electrodialysis was conducted at 40° C, with a current density of 10 A/dm$^2$. When the electrodialysis reached steady state an aqueous solution of sodium hydroxide (16.9 wt.% in equilibrium concentration) was continuously obtained with a current efficiency of 91.6% and the voltage of the unit cell was 1.56 volts.

EXAMPLE 2

To 36 wt. parts of pellets of a copolymer of ethylene and methacrylic acid (20 % of methacyclic acid; zinc salt; molecular ratio of methacrylic acid/ethylene: 0.05; number average molecular weight 70,000: glass transition temperature: −80° C) having an ion-exchange capacity of 1.5 m equivalent/g (dry resin) (Copolymer II) were mixed 64 wt. parts of pellets of the copolymer of ethylene and methacrylic acid of Copolymer I of Example 1 and the mixture was melted and extruded to prepare a membrane having a thickness of 100μ. The membrane was treated in 8N-KOH at 60° C for 14 hours to prepare a cation-exchange membrane (potassium salt). The cation-exchange membranes and the anion-exchange membranes of Selemion AMV of Example 1 were alternatively arranged and fastened to prepare an electrodialytic cell in accordance with the preparation of Example 1. The concentration of potassium hydroxide was conducted by electrodialysis using this cell, in accordance with the process of Example 1 except feeding an aqueous potassium hydroxide solution (2.5 wt.%) to the diluting compartment and charging an aqueous potassium hydroxide solution (7.5 wt.%) into the concentration compartment. Under steady state, conditions, a potassium hydroxide aqueous solution (24.0 wt.% in equilibrium concentration) was continuously obtained with a current efficiency of 90.2% and the voltage of the unit cell was 1.35 volts.

EXAMPLE 3

The electrodialysis was conducted in accordance with the process of Example 1 except feeding 0.5N-NH$_4$OH to the diluting compartment and charging water into the concentrating compartment, and using a current density of 1 A/dm$^2$. As a result, an aqueous ammonia solution (1.8 N in equilibrium concentration) was continuously obtained from the concentrating compartment with a current efficiency of 76%.

COMPARISON EXAMPLE 1

A mixture of 62.5 wt. parts of styrene, 10 wt. parts of divinylbenzene, 7.5 wt. parts of ethylvinylbenzene, 20 wt. parts of n-butyl acrylate, 2 wt. parts of benzoylperoxide and 5.0 wt. parts of acrylonitrile-butadiene rubber (Nipol/562 manufactured by Nippon Zeon Company Ltd.) was coated on a polyvinyl chloride cloth. The coated cloth was covered with two sheets of polyvinylalcohol film and heated under compression at 65° C for 1 hour and then at 100° C for 3 hours to polymerize them to prepare the membrane substrate. The membrane substrate was sulfonated in 98% H$_2$SO$_4$ at 60° C for 5 hours to prepare a cation-exchange membrane having a thickness of 161$\mu$, an electric resistance of 2.8 $\Omega$/cm$^2$ at 25° C in 0.5N-NaCl and a static transport number of 0.93 which was measured by membrane potential between 1M/0.5M NaCl. The electrodialysis of a sodium hydroxide aqueous solution was conducted in accordance with the proces of Example 1 except using said cation-exchange membrane. As a result, a sodium hydroxide aqueous solution having an equilibrium concentration of 13.1% was continuously obtained with a current efficiency of 60%.

EXAMPLE 4

A membrane of the copolymer of ethylene and methacrylic acid of Example 1 having a thickness of 100$\mu$ was treated in 8N-NaOH at 70° C for 5 hours. The effective resistance of the membrane was 7.5 $\Omega$/cm$^2$. The treated membrane (effective area of membrane of 25 cm$^2$) was arranged between a platinum anode and an iron cathode. 4N-NaCl was fed to the anolyte compartment at a flow rate of 150 ml/hour, and 8N-NaOH was charged in the catholyte compartment at first, and water was continuously fed to the catholyte compartment at a flow rate of 11 ml/hours; the electrolysis was conducted at 50° C in a current of 5A and a current density of 20 A/dm$^2$. The concentration of sodium hydroxide obtained from the catholyte compartment was 8.9 N and the current efficiency was 94.7%.

EXAMPLE 5

The electrolytic cell of Example 4 was used. 4N-NaCl was fed to the anolyte compartment at a flow rate of 150 ml/hour. 10N-NaOH was charged in the catholyte compartment at first and water was continuously fed at a flow rate of 6.6 ml/hour, the electrolysis was conducted at 51° C in a current of 5A and a current density of 20 A/dm$^2$. The concentration of NaOH was 10.2N and the current efficiency was 94.8%.

EXAMPLE 6

A membrane of the copolymer of ethylene and methacrylic acid of Example 1 having a thickness of 100$\mu$ was treated in 8N-NaOH at 60° C for 16 hours to prepare the treated membrane (sodium salt). A titanium-rhodium anode, a fluorine-containing cation-exchange membrane having a thickness of 100$\mu$ ("Nafion X 12124" ion-exchange capacity 0.83 m equivalent/g manufactured by E. I du Pont de Nemours & Company), the treated membrane (effective area of membrane of 25 cm$^2$) and an iron cathode were arranged to form three compartment electrolytic cell. The thickness of the intermediate compartment was 7 mm and the distance between the electrodes was 17 mm. 4N-NaCl was fed to an anolyte compartment at a flow rate of 150 ml/hour and 4N-NaCl was fed to the intermediate compartment at a flow rate of 70 ml/hour. 8N-NaOH was charged in the catholyte compartment at first and water was continuously fed at a low rate of 11 ml/hour; the electrolysis was conducted at 55° C, in a current density of 20 A/dm$^2$ and a voltage of 4.9 volts. As a result, 8.9N-NaOH was continuously obtained from the catholyte compartment with a current efficiency of 94.7% at steady state conditions. The content of NaCl in the resulting NaOH aqueous solution was 40 ppm.

EXAMPLE 7

The mixture of two copolymers of ethylene and methacrylic acid, 64 wt. parts of the Copolymer I of Example 1 and 36 wt. parts of the Copolymer II of Example 2 were blended on a roll mill at 140° C for 10 minutes and then pressed at 190° C for 7 minutes under a pressure of 60 kg/cm$^3$ to prepare a membrane. The membrane was treated in 8N-KOH at 60° C for 16 hours to prepare the treated membrane (potassium salt). An electrolytic cell was prepared in accordance with the preparation of Example 5 except using the above treated membrane. 3N-KCl was fed to the anolyte compartment at a flow rate of 150 ml/hour and 3N-KCl was fed to the intermediate compartment at a flow rate of 70 ml/hour. 8N-KOH was charged in the catholyte compartment at first and water was continuously fed to the catholyte compartment at a flow rate of 4 ml/hour; the electrolysis was conducted at 55° C in a current density of 20 A/dm$^2$ and a voltage of 5.0 volts. As a result, 11.8N-KOH was continuouously obtained from the catholyte compartment with a current efficiency of 93.4% under steady state conditions. The content of KC in the resulting KOH aqueous solution was 133 ppm.

EXAMPLE 8

A mixture of 50 wt. parts of copolymer I of Example 1 and 50 wt. parts of copolymer II of Example 2 was blended, molded and treated in accordance with the process of Example 7 to prepare a cation-exchange membrane having a thickness of 250$\mu$. The electrolytic cell was prepared by using the treated membrane and the electrolysis of the aqueous solution was conducted in accordance with the process of Example 7 except applying a voltage of 5.2 volts. As a result, 12. 1N-KCl was continuously obtained with a current efficiency of 91.9% at steady state conditions. The content of KCl in the resulting KOH aqueous solution was 45 ppm.

Having now fully descirbed the invention, it will be apparent to one of ordinary skill in the art that many changes and modifications can be made thereto without departing from the spirit or scope of the invention as set forth herein.

What is claimed as new and intended to be covered by Letters Patent is:

1. In an electrodialysis process for aqueous base-containing solutions the improvement which comprises using a sulfonic acid group-free cation-exchange membrane which is a copolymer of ethylene and an unsaturated carboxylic acid or a salt thereof having an ion-exchange capacity of 0.7 to 3 m equivalent/g (dry resin).

2. The electrodialysis process of claim 1 which is an electrolytic dialysis.

3. The electrodialysis process of claim 1, where the aqueous base-containing solution is an aqueous solution of alkali metal hydroxide, ammonia or an amine.

4. The electrodialysis process of claim 1, wherein the cation-exchange membrane is made of copolymer of ethylene and an unsaturated carboxylic acid or salt thereof wherein the unsaturated carboxylic acid is acrylic acid, methacrylic acid, itaconic acid, maleic acid, fumaric acid or a precursor thereof, and a molar ratio of the unsaturated carboxylic acid to ethylene is in a range of 0.02 to 0.15.

5. The electrodialysis process of claim 1, wherein the copolymer of ethylene and an unsaturated carboxylic acid or salt thereof has units having the formula

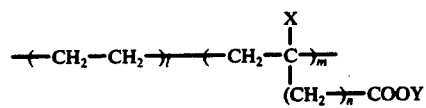

wherein X represents hydrogen or methyl; Y represents hydrogen or a metal atom; m/l (molar ratio) is 0.02 to 0.15 and n is 0 to 10.

6. The electrodialysis process of claim 5, wherein the copolymer has the unit formula in which Y is H, Na or Zn; and m/l (molar ratio) is 0.03 to 0.12

7. The electrodialysis process of claim 1, wherein the cation-exchange membranes of the copolymer and anion-exchange membranes are alternatively arranged between an anode and a cathode to form a diluting compartment partitioned with the cation-exchange membrane in the cathode side and the anion-exchange membrane in the anode side and an ajacent concentrating compartment partitioned with the anion-exchange membrane in the cathode side and the cation-exchange membrane in the anode side; and the aqueous base-containing solution is fed to the diluting compartment and the concentrated aqueous base-containing solution is obtained from the concentrating compartment.

8. The electrodialysis process of claim 2 which is electrolytic dialysis, wherein an anolyte compartment and a catholyte compartment are formed by partition between an anode and a cathode with the cation-exchange membrane of the copolymer and an alkali chloride aqueous solution is fed to the anolyte compartment and the electrolysis is conducted by applying the current to obtain alkali hydroxide from the catholyte compartment.

9. The electrodialysis process of claim 8, wherein a diaphragm having high oxidation and chlorine resistance is disposed between the anode and the cation-exchange membrane.

10. The electrodialysis process of claim 9, wherein the diaphragm is a fluorine-containing cation-exchange membrane of a copolymer of tetrafluoroethylene and a sulfonated or carboxylated perfluorovinyl ether.

11. The electrodialysis process of claim 1, wherein the cation-exchange membrane of the copolymer is reinforced with a support 12. The electrodialysis process of claim 1, wherein the cation-exchange membrane is made of the copolymer of ethylene and an unsaturated carboxylic acid or salt thereof, which copolymer has a glass transition temperature of at least 20° C below the temperature for the electrodialysis.

* * * * *